(12) United States Patent
Belanger

(10) Patent No.: US 9,446,639 B2
(45) Date of Patent: Sep. 20, 2016

(54) FLOAT ACCESSORY FOR A LAND VEHICLE

(71) Applicant: Claude Belanger, Sept-Iles (CA)

(72) Inventor: Claude Belanger, Sept-Iles (CA)

( * ) Notice: Subject to any disclaimer, the term of this patent is extended or adjusted under 35 U.S.C. 154(b) by 0 days.

(21) Appl. No.: 14/941,603

(22) Filed: Nov. 15, 2015

(65) Prior Publication Data

US 2016/0137014 A1 May 19, 2016

(30) Foreign Application Priority Data

Nov. 14, 2014 (GB) .................................. 1420287.3

(51) Int. Cl.
*B60F 3/00* (2006.01)
*B63H 5/08* (2006.01)
*B63H 1/14* (2006.01)

(52) U.S. Cl.
CPC .............. *B60F 3/0038* (2013.01); *B63H 1/14* (2013.01); *B63H 5/08* (2013.01)

(58) Field of Classification Search
CPC .......... B63H 1/14; B63H 5/08; B60F 3/0038
See application file for complete search history.

(56) References Cited

U.S. PATENT DOCUMENTS

| | | | |
|---|---|---|---|
| 3,215,114 A | 11/1965 | Jenkins | |
| 3,640,239 A * | 2/1972 | Petroskey | ............ B63H 21/175 440/12 |
| 3,709,185 A | 1/1973 | Hennel | |
| 4,050,399 A | 9/1977 | Mochel | |
| 4,494,937 A | 1/1985 | Riermann | |
| 4,522,420 A * | 6/1985 | Hannappel | ............ B62D 63/065 180/196 |
| 4,593,640 A * | 6/1986 | Blunschi | .............. B63H 21/175 114/123 |
| 4,664,051 A | 5/1987 | Newkirk | |
| 6,119,284 A * | 9/2000 | Cosman | .................. E04H 4/106 4/498 |
| 6,666,735 B2 | 12/2003 | Benoit | |
| 7,090,549 B2 * | 8/2006 | Garcia | ..................... B63H 7/02 114/61.1 |
| 7,182,031 B2 * | 2/2007 | Nilson | .................. B60F 3/0038 114/123 |
| 7,497,182 B2 | 3/2009 | Grove | |

FOREIGN PATENT DOCUMENTS

| | | |
|---|---|---|
| CA | 2177463 | 11/1997 |
| CA | 2420813 | 2/2003 |
| CA | 2537168 | 8/2007 |
| JP | 2185811 | 7/1990 |

* cited by examiner

*Primary Examiner* — Stephen Avila

(57) ABSTRACT

A float accessory for land vehicles has a front rack portion and a rear rack portion. Both rack portions are mechanically fastened to a frame assembly which is itself attached to a vehicle frame. The front rack portion is connected to the frame assembly, and the front rack portion and the rear rack portion have two sides wherein each side has a lifting arm rotationally attached thereto by way of a pivot member. The lifting arms are secured in their lowered configuration by way of a latch and catch combination. The lifting arms are also locked in their upper configuration and intermediate configurations by way of a perforated disc cooperating with a spring lock pin.

14 Claims, 13 Drawing Sheets

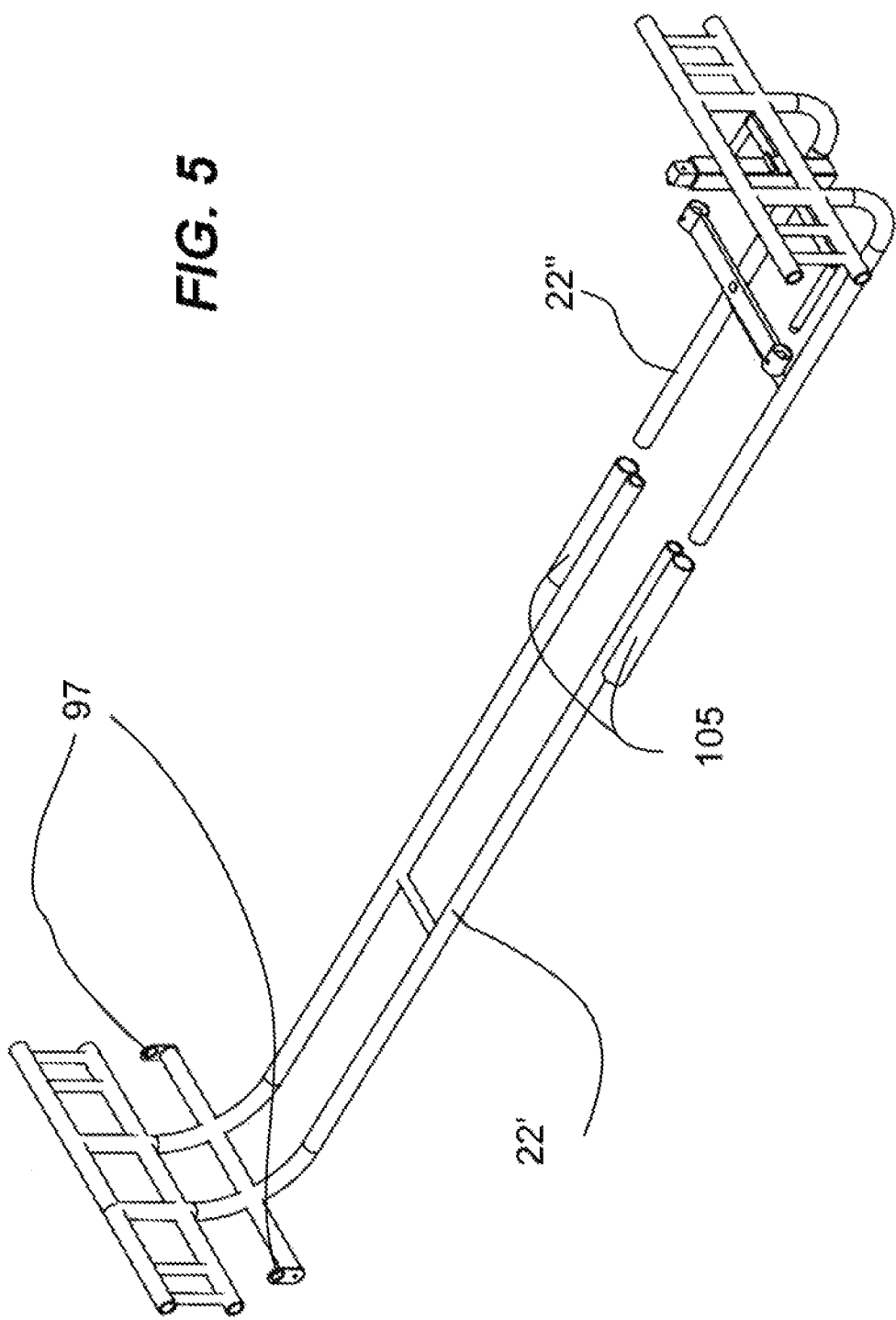

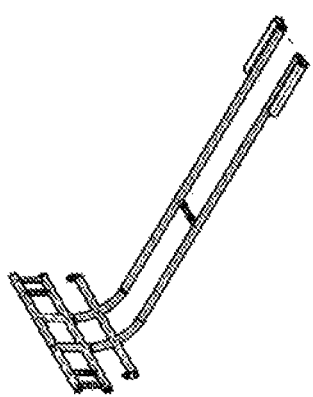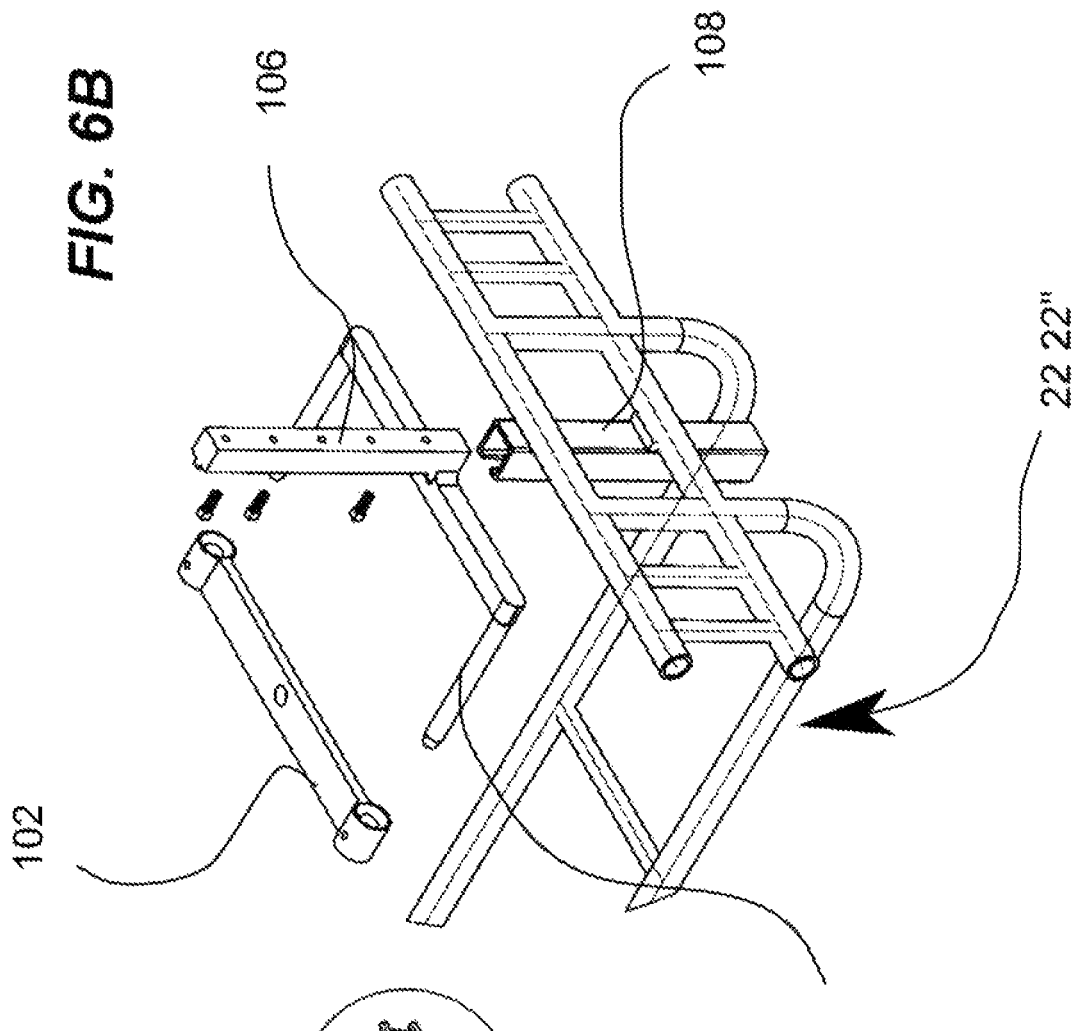

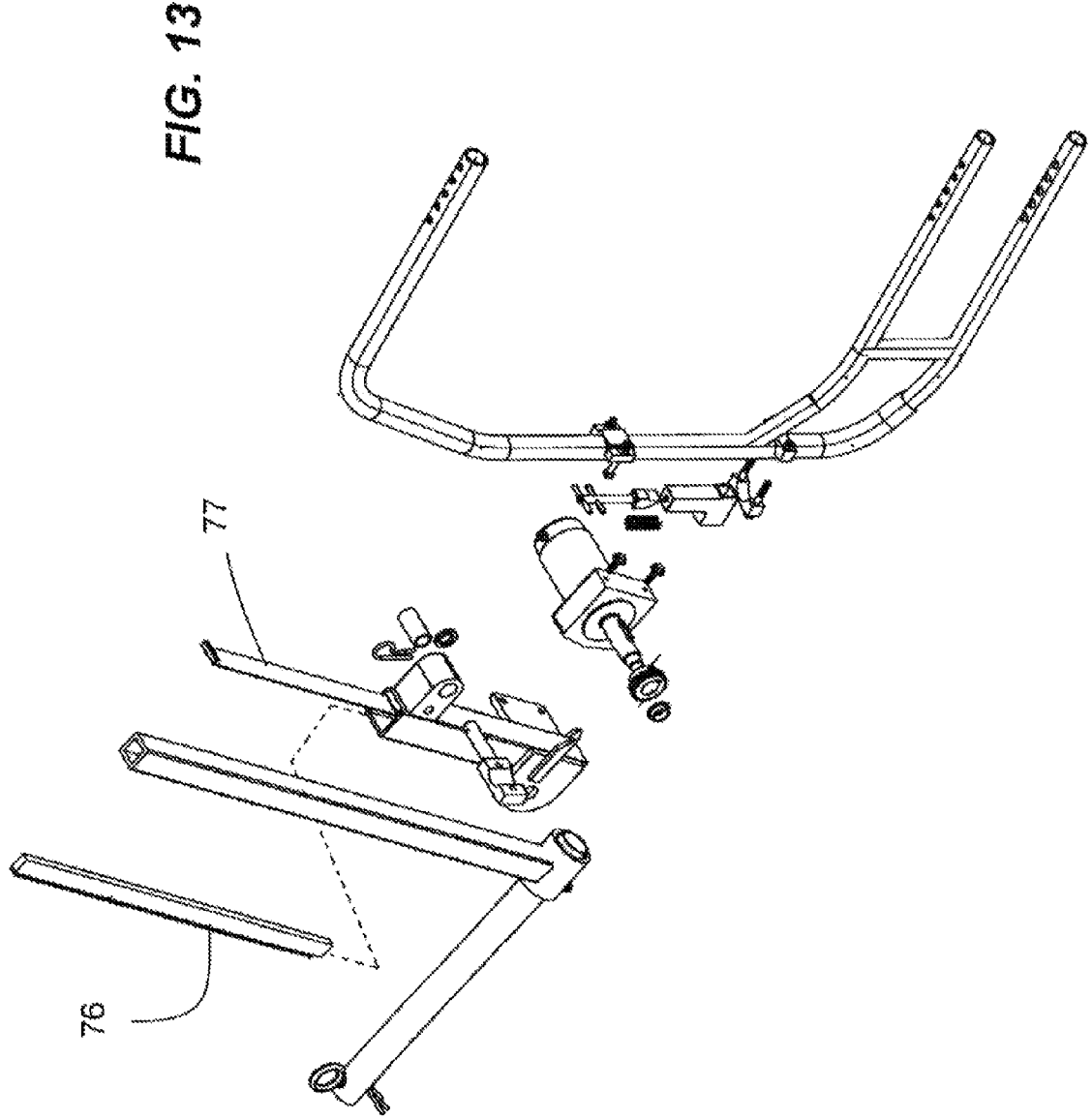

FLOAT ACCESSORY FOR A LAND VEHICLE

FIELD OF THE INVENTION

The present invention relates generally to all terrain vehicles but more particularly to a float accessory for land vehicles.

BACKGROUND OF THE INVENTION

All types of vehicles but most particularly four wheelers and ATVs are very popular with hunters and fishermen. Sometimes, wilderness areas have many lakes which limit how one can travel when using a land vehicle. There should be a practical way of having a vehicle that can go on water.

SUMMARY OF THE INVENTION

In view of the foregoing disadvantages inherent in the known devices now present in the prior art, the present invention, which will be described subsequently in greater detail, is to provide objects and advantages which are:

To provide for an accessory that can be installed on a land vehicle.

In order to do so, the invention has a front rack portion and a rear rack portion. Both rack portions are mechanically fastened to a frame assembly which is itself attached to a vehicle frame. The front rack portion is connected to the frame assembly, and the front rack portion and the rear rack portion have two sides wherein each side has a lifting arm rotationally attached thereto by way of a pivot member. The lifting arms are secured in their lowered configuration by way of a latch and catch combination. The lifting arms are also locked in their upper configuration and intermediate configurations by way of a perforated disc cooperating with a spring lock pin. A grommet connected to at least the front rack portion lifting arms, and in combination with a cable, wherein the cable is connected to a hoist apparatus. The hoist apparatus pulls on the cable in order to lift the lifting arms. The lifting arms are attached to floats by way of a float attachment member itself being connected to an inverted "T" member configured and sized to fit inside a groove forming an integral part of the float.

The front and rear rack portions are divided into two halves which are connected, at the bottom, to the frame assembly and, at the top, to a connector member.

A plurality of rack spacer holes for adjusting the width of the front rack portion so that it can adapt to a variety of vehicles.

The width of the front rack portion is adjusted by passing mechanical fasteners through the rack spacer holes and frame spacer holes.

The rear rack portion and the front rack portion have loops for attaching hooks or straps.

The frame assembly has a front portion which is mechanically fastened at the front of the vehicle by way of straps passing through frame assembly grommets which connect to a vehicle's front element.

The frame assembly has a rear portion mechanically fastened to the location of a ball hitch by way of a ball hitch attachment bracket and wherein the ball hitch attachment bracket being slidingly connected to an attachment bracket member, and sliding tubes forming part of the front portion slidingly connecting with the rear portion.

The attachment bracket member has a vertical stem member extending perpendicularly and vertically therefrom and which is configured and sized to slidingly engage a channel member fixedly attached to the frame assembly and wherein mechanical fasteners secure a desired position for the vertical stem member inside the channel member.

A propulsion assembly extends rearwardly from the rear portion and having at least one back plate configured and sized for receiving a propulsion unit.

The propulsion assembly is raisable and lowerable by way of a propulsion assembly piston member, and wherein a directional orientation of the propulsion unit is adjustable by way of a directional piston member connected to a piston holding bracket.

The front rack portion has a set of pulleys and a centrally located roller member to guide the at least one lifting cables which has one of its end attached to grommets, and the opposite end attached to the hoist apparatus.

The float attachment members is connected to the lifting arms by sliding through them.

A linear gear located inside each of the lifting arms, and alongside an anti friction slip, allows an electric motor gearingly connected thereto to adjust the height of the floats.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIG. 5 Isometric view of the frame.

FIGS. 6a-b Isometric view of the frame and isometric detail of the rear portion.

FIG. 13 Exploded view of the lifting arm showing the linear gear.

DETAILED DESCRIPTION

Figure 1:
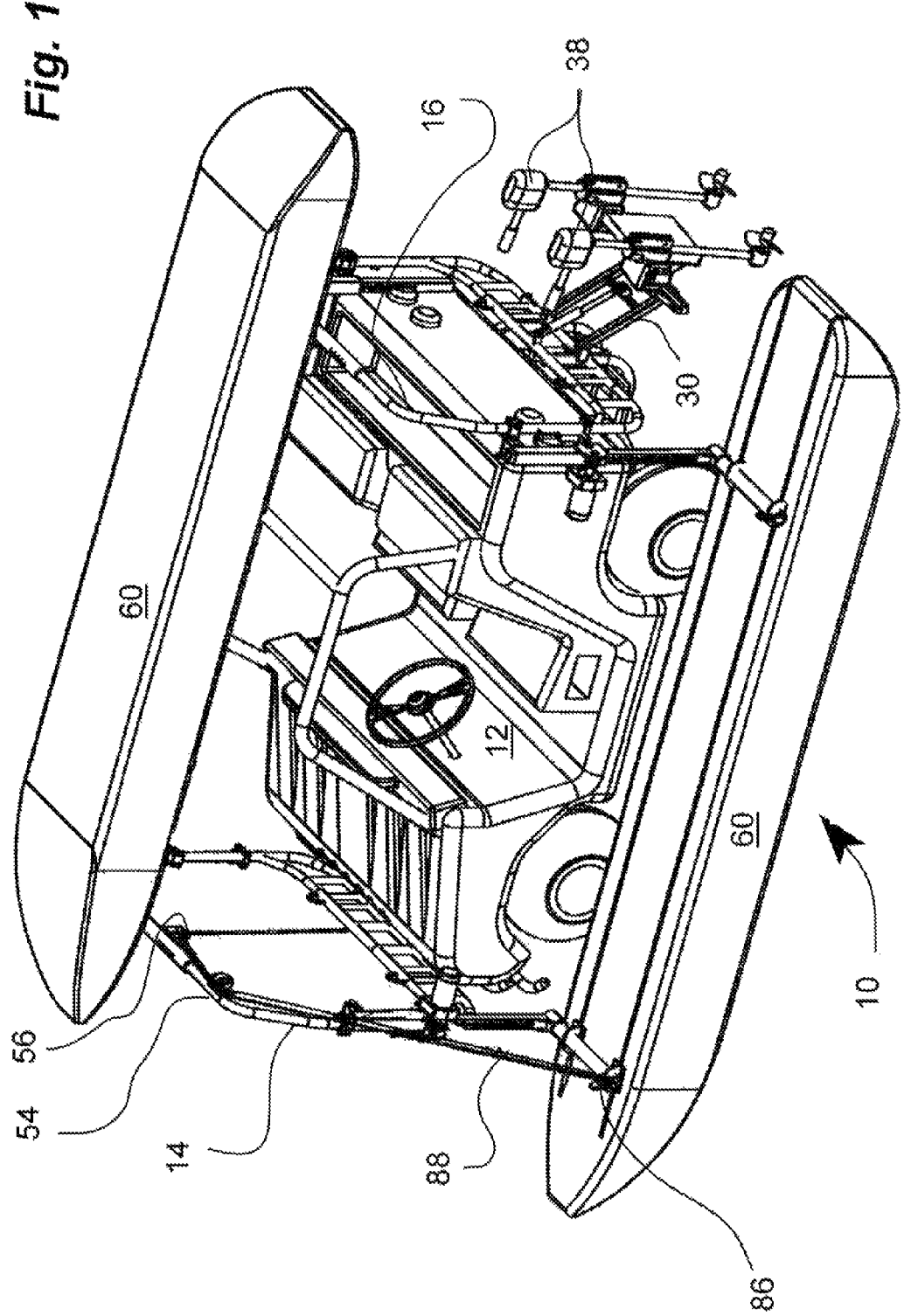
FIG. 1 Isometric view of the invention installed on a vehicle.
Figure 2:
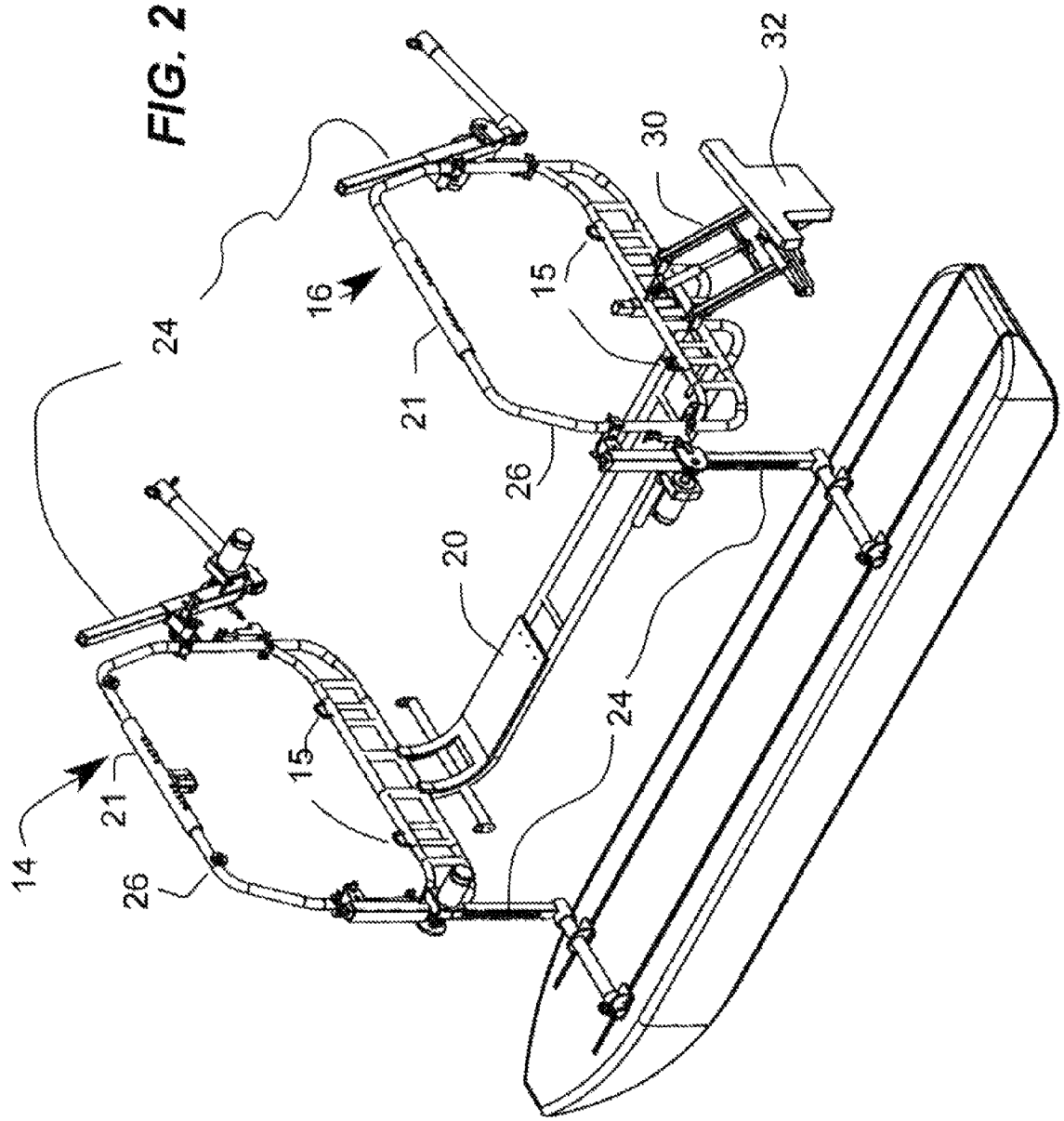
FIG. 2 Isometric view of the invention.
Figure 3:
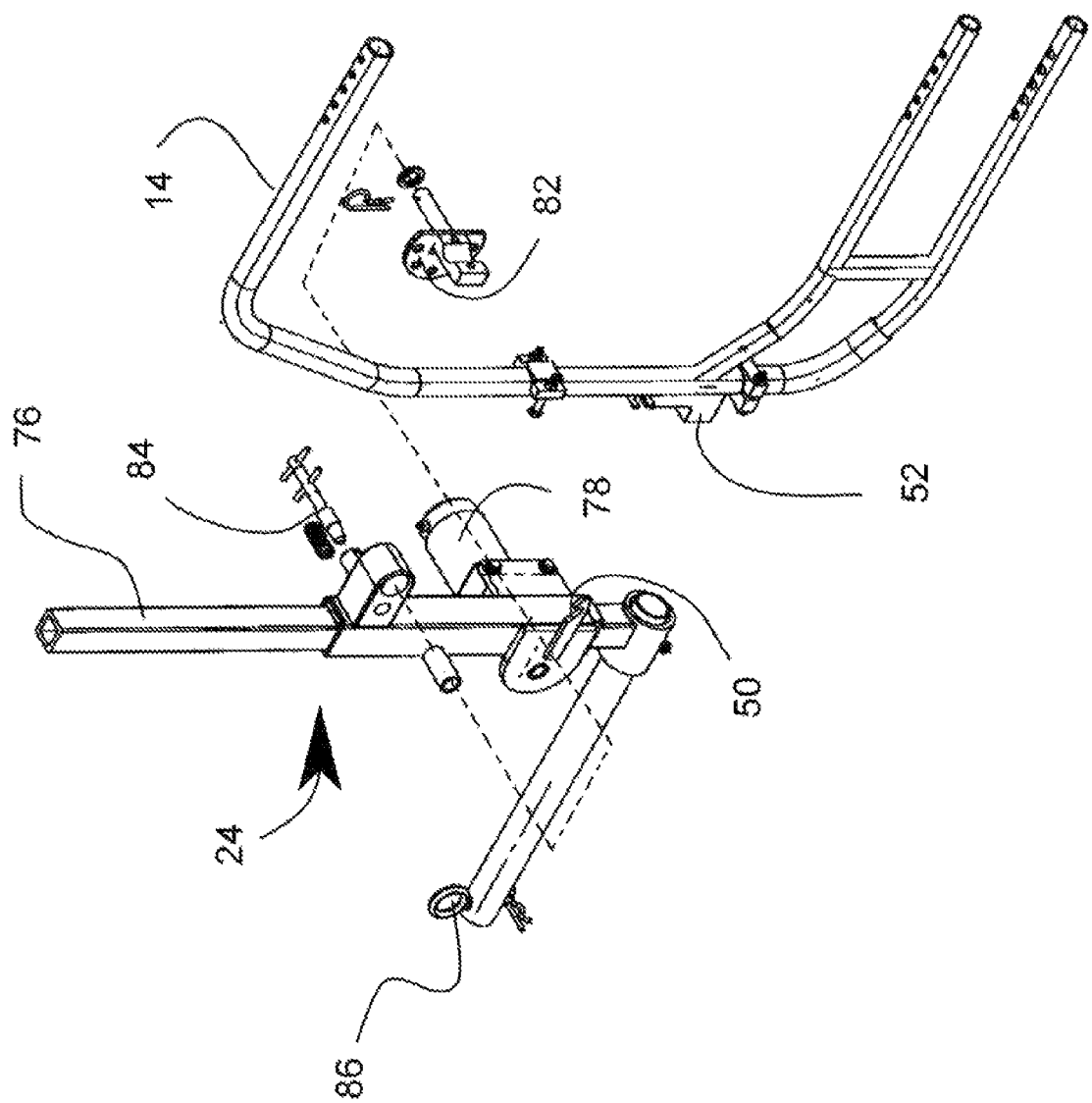
FIG. 3 Exploded view of a lifting arm.
Figure 4:
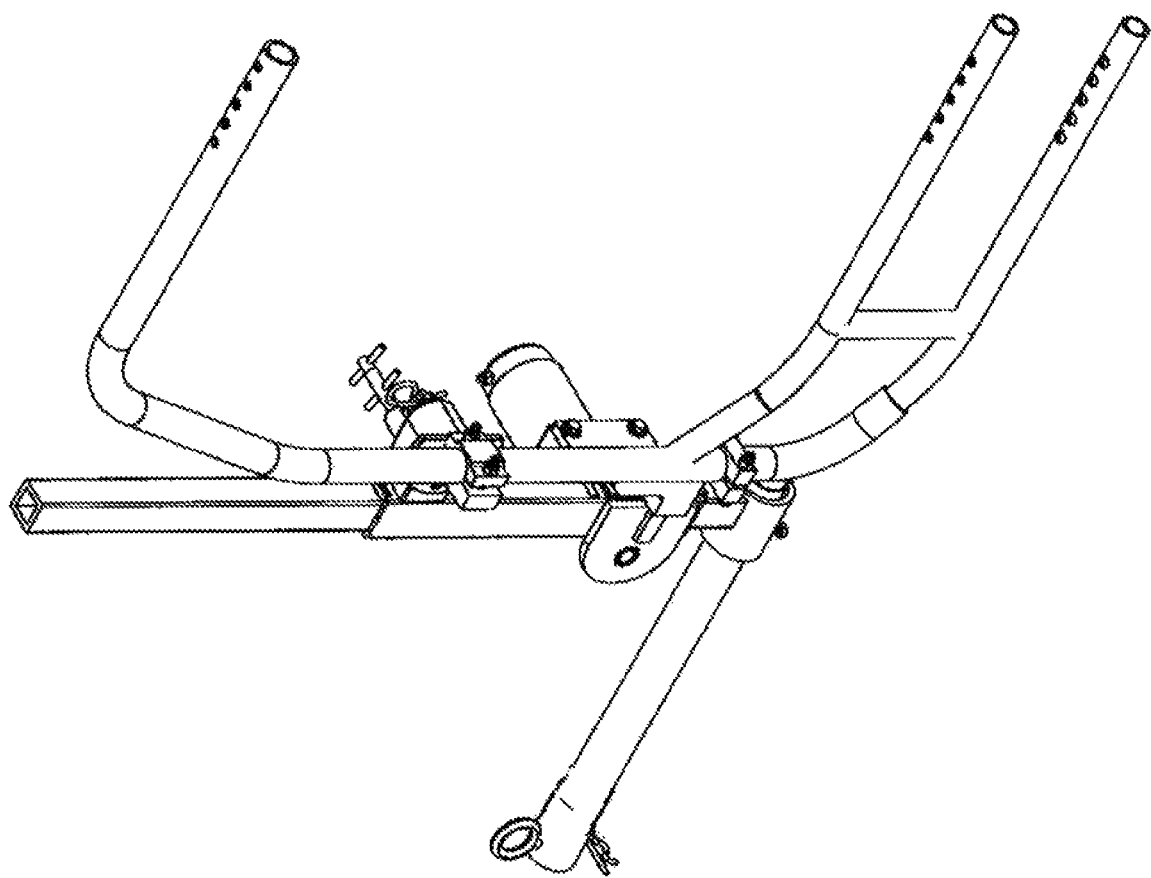
FIG. 4 Isometric view of a lifting arm.
Figure 7:
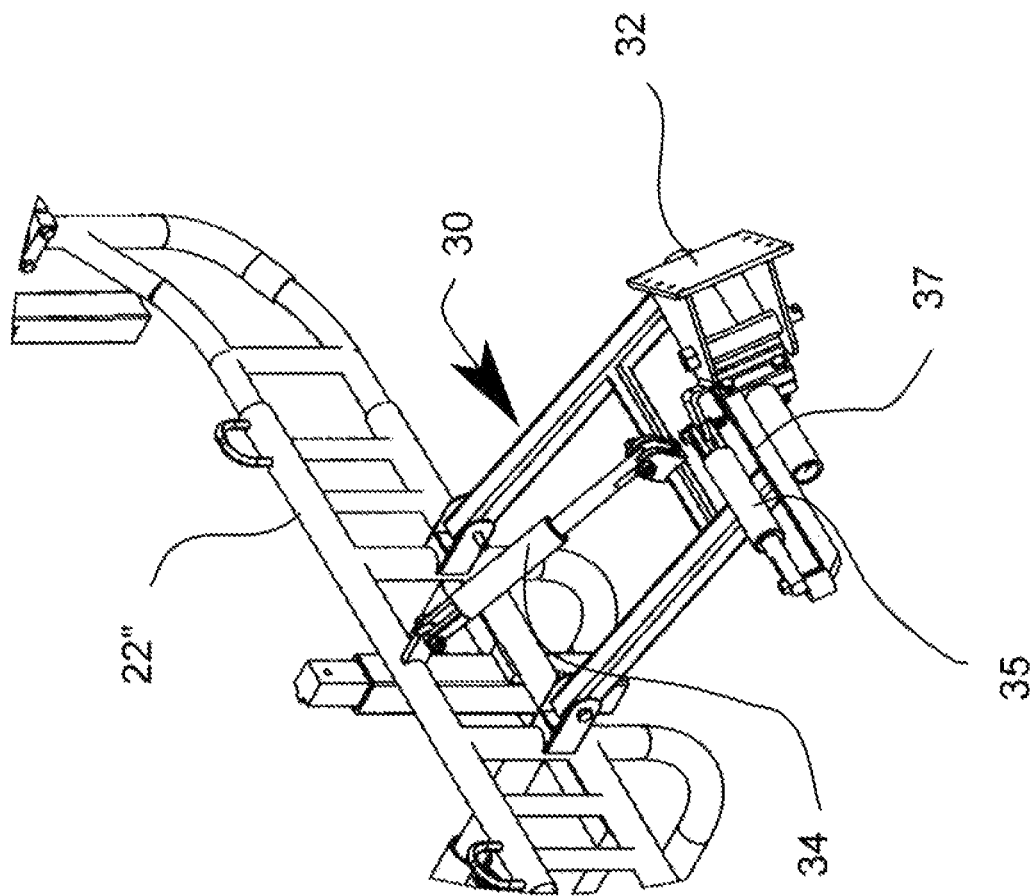
FIG. 7 Isometric view of the propulsion assembly.
Figure 8:
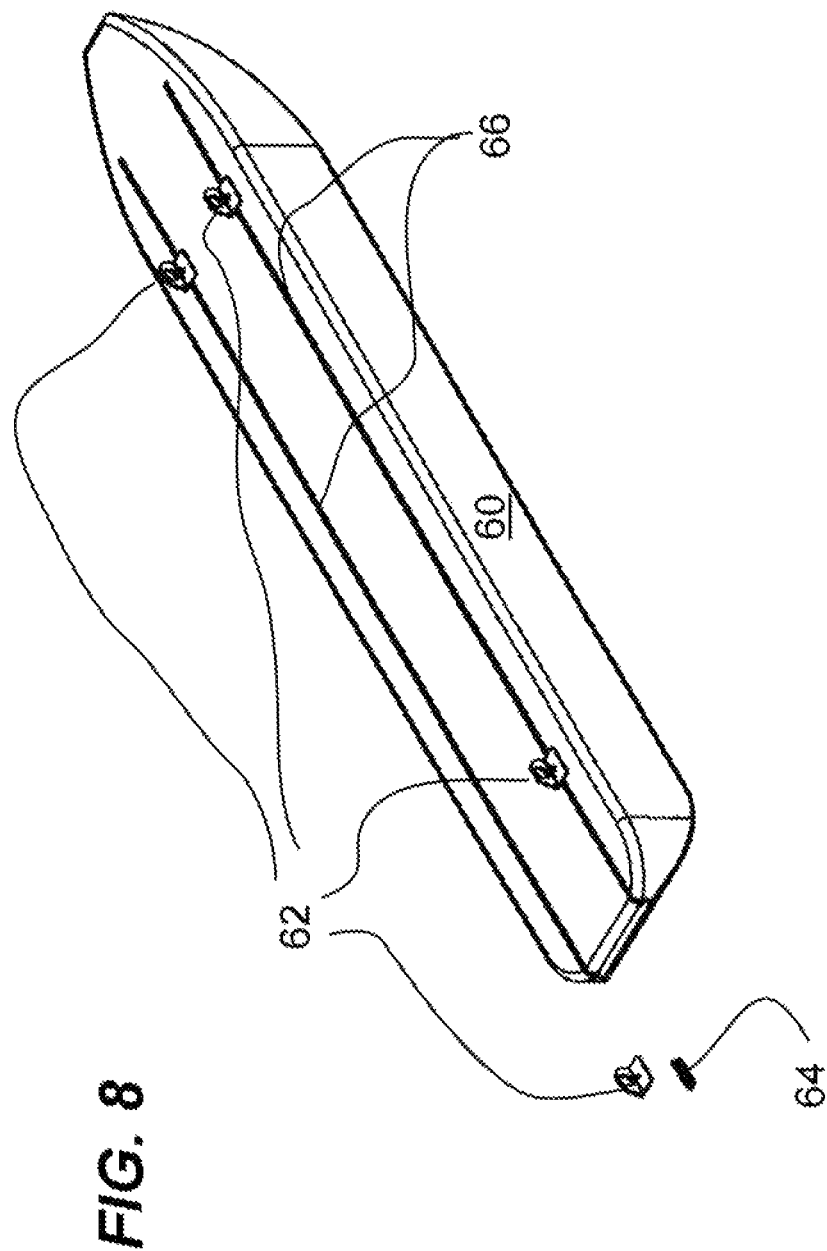
FIG. 8 Isometric view of a float.
Figure 9:
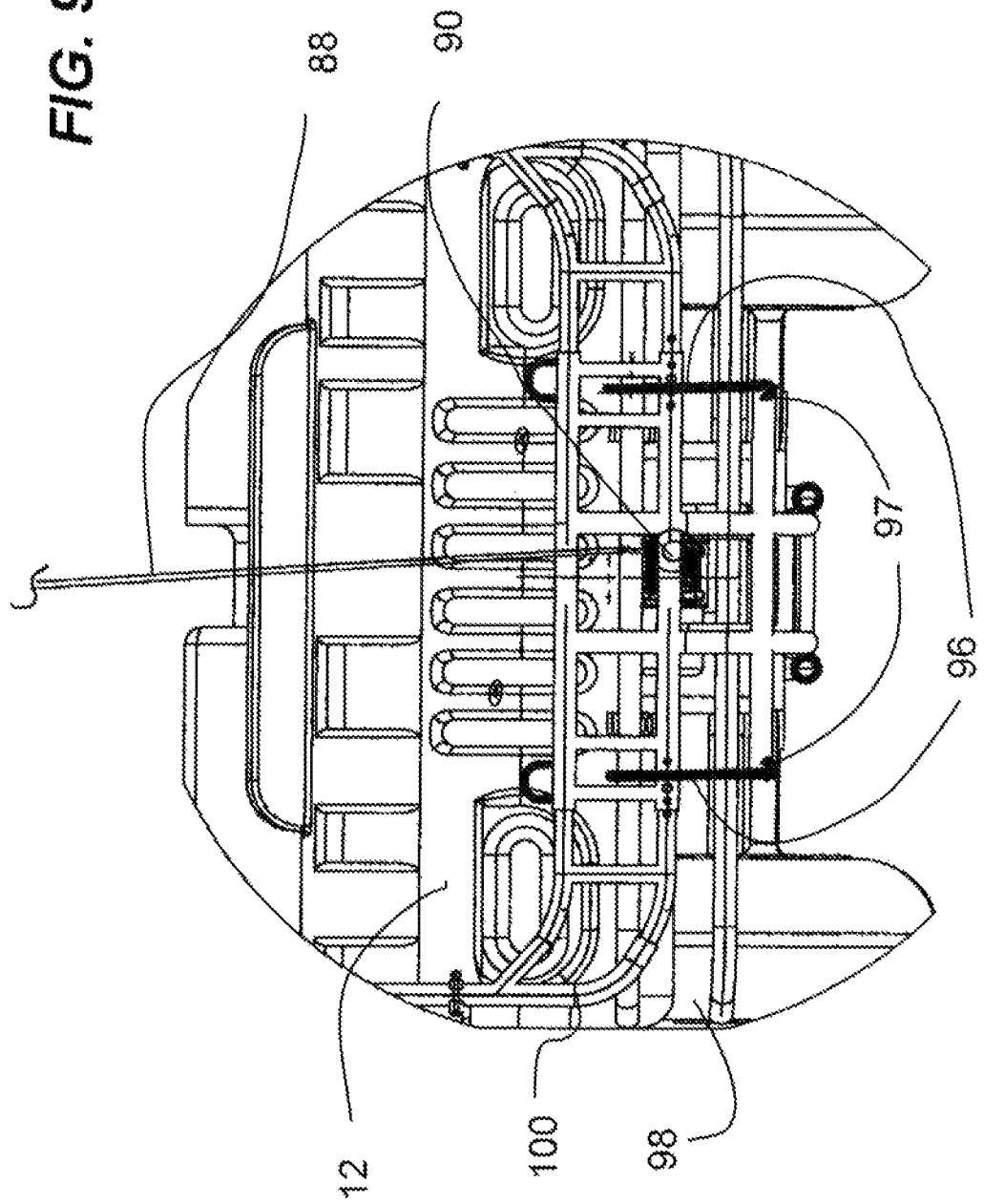
FIG. 9 Front view of the vehicle with frame assembly.
Figure 10:
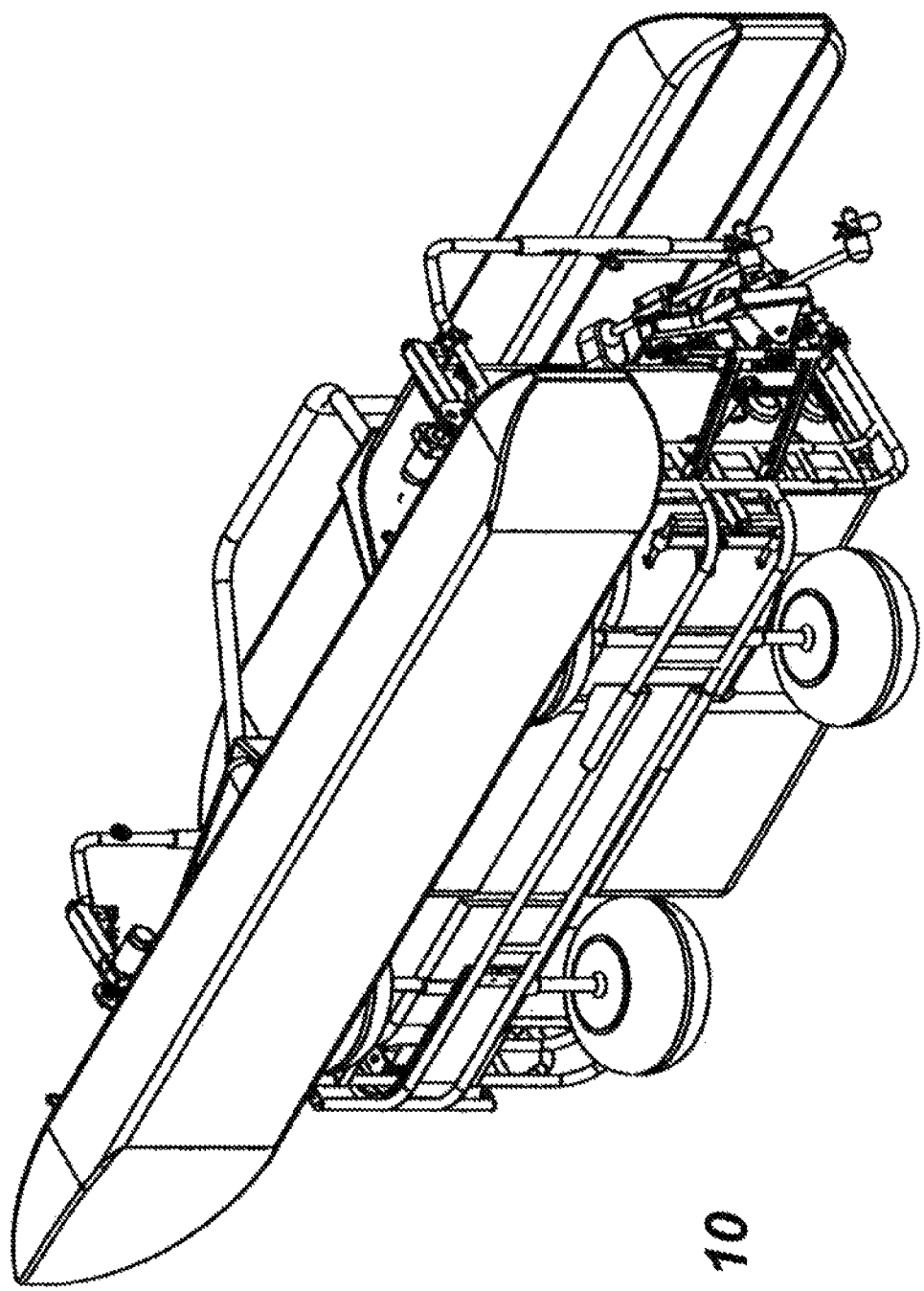
FIG. 10 Isometric view favoring the underside of the vehicle.
Figure 11:
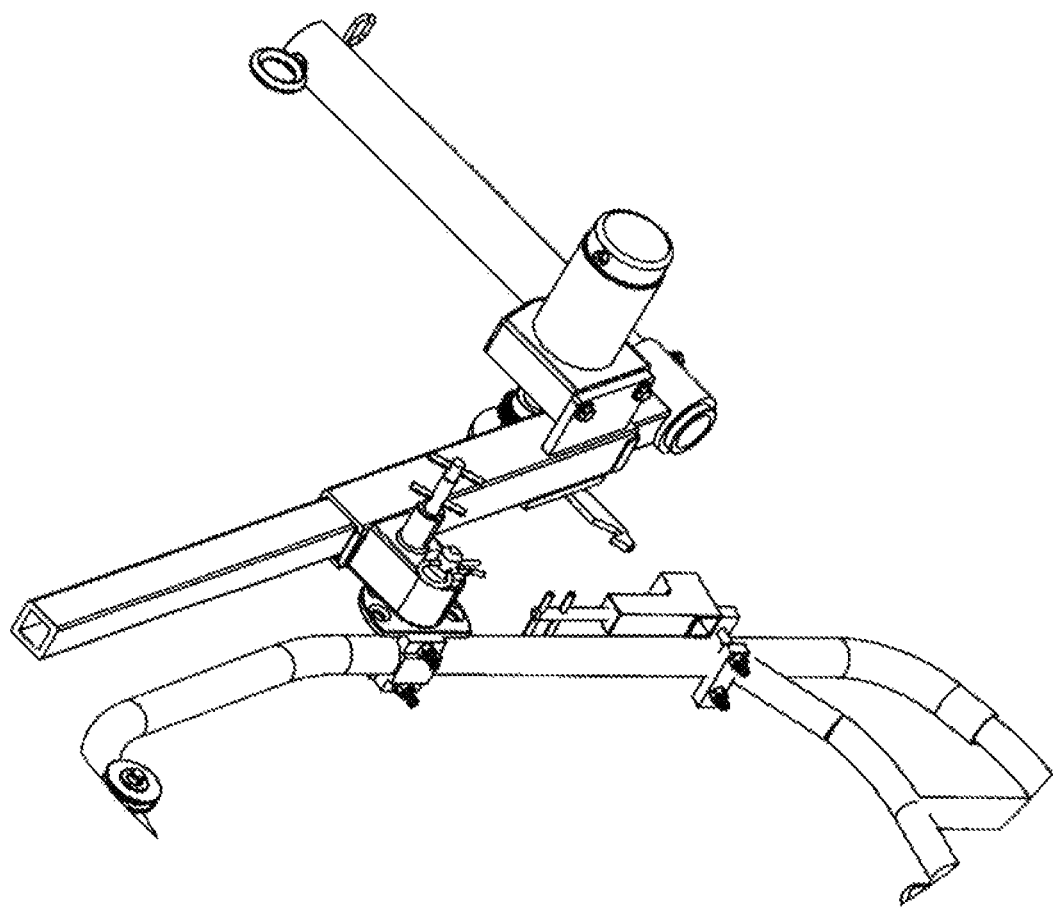
FIG. 11 Reverse angle view of FIG. 4.
Figure 12:
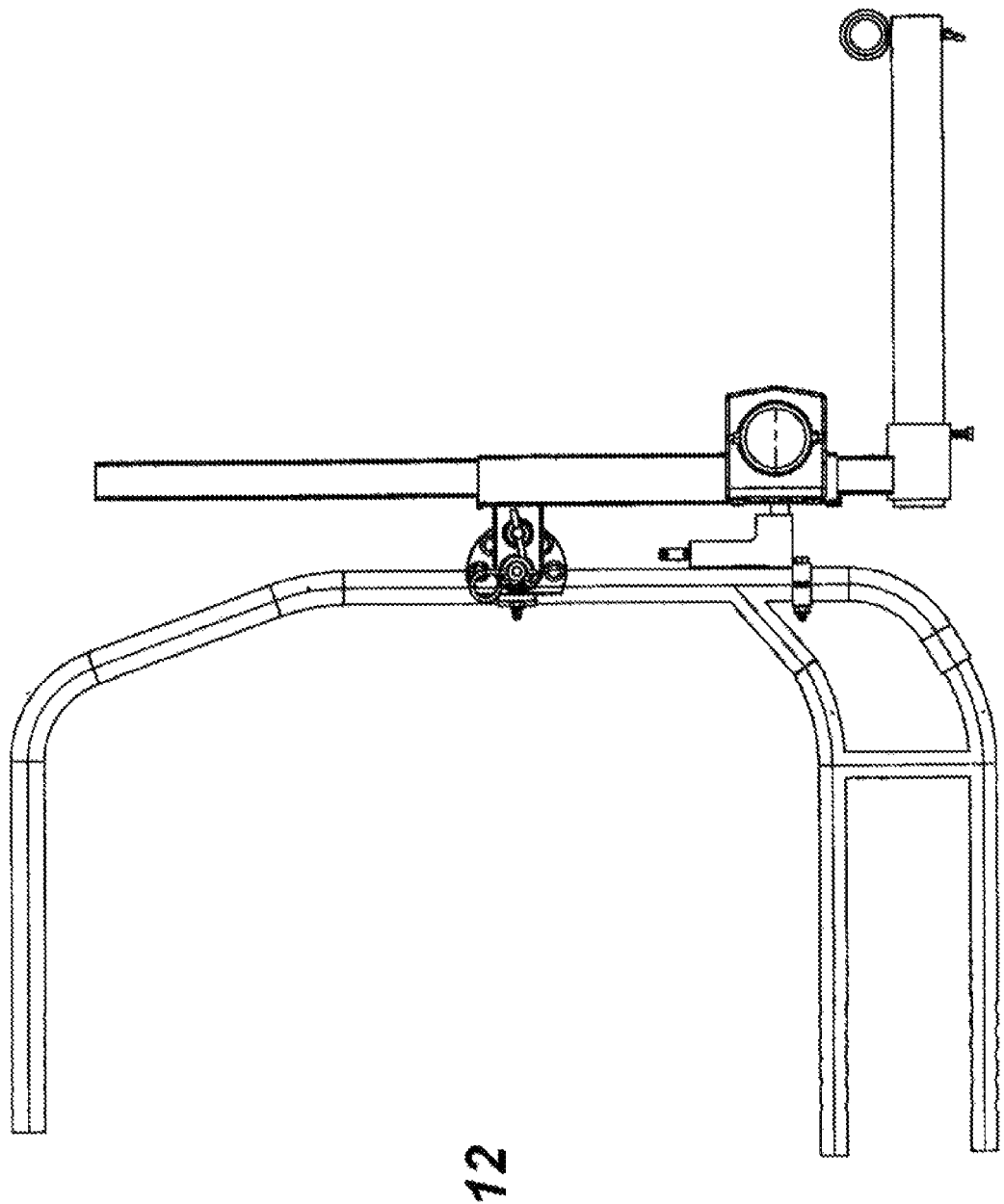
FIG. 12 Front view of the lifting arm.

A float accessory (10) for a vehicle (12) has a front rack portion (14) and a rear rack portion (16). Both rack portions (14, 16) are mechanically fastened to a frame assembly (22) which is itself attached to a vehicle frame (20).

The front rack portion (14) is connected to the frame assembly (22), and it has two lifting arm (24) rotationally attached thereto by way of a pivot member (25). The lifting arms (24) are secured in their lowered configuration by way of a latch (50) and catch (52) combination. They can also be locked in their upper configuration, as well as selected intermediate configurations, by way of a perforated disc (82) cooperating with a spring lock pin (84).

A grommet (86) is used with at least one cable (88) connecting to a hoist apparatus (90). The hoist apparatus (90) pulls the at least one cable (88) which then lifts the lifting arm (24). The front rack portion (14) is divided in two halves which are connected, at the bottom, to the frame assembly (22) and, at the top, to a connector member (21). A plurality of rack spacer holes (92) allows for adjusting the width of the front rack portion (14) so that it can adapt to a variety of vehicles (12) by passing mechanical fasteners (93) through the rack spacer holes (92) and frame spacer holes (94).

The rear rack portion (16) shares the same components as the front rack portion (14). Both also have loops (15) for attaching hooks or straps.

The frame assembly (22) has a front portion (22') which is mechanically fastened at the front of the vehicle (12) by way of straps (96) passing through frame assembly grommets (97) which connect to a vehicle's front element which can be either a bumper member (98) or a steel grille member (100). At the rear, the frame assembly (22) has a rear portion (22") which is mechanically fastened to the location of a ball hitch (not shown) by way of a ball hitch attachment bracket (102) which is itself slidingly connected to an attachment bracket member (104). The sliding aspect of the attachment bracket member (104) allows for it to adapt to a variety of vehicle (12) length, especially when in combination with sliding tubes (105) forming part of the front portion (22') and slidingly connecting with the rear portion (22"). In order to adjust vertically, the attachment bracket member (104) has a vertical stem member (106) extending perpendicularly and vertically therefrom and which is configured and sized to slidingly engage a channel member (108) fixedly attached to the frame assembly (22). Mechanical fasteners secure a desired position for the vertical stem member (106) inside the channel member (108).

Extending rearwardly from the rear portion (22") is a propulsion assembly (30) which has at least one back plate (32) designed for receiving a propulsion unit (38) such as a motor, for example. The propulsion assembly (30) can be raised and lowered by way of a propulsion assembly piston member (34), and the directional orientation of the propulsion unit (38) can be adjusted by way of a directional piston member (35) connected to a piston holding bracket (37).

The front rack portion (14) has a set of pulleys (54) and a centrally located roller member (56) to guide the at least one lifting cable (88) which have one of their ends attached to grommets (86) and the opposite end attached to the hoist apparatus (90).

The lifting arms (24) are attached to the floats (60) by way of a float attachment member (62) itself being connected to an inverted "T" member (64) configured and sized to fit inside a groove (66) forming an integral part of the float (60). The float attachment members (62) are connected to the lifting arms (24) by sliding through them.

A linear gear (76) located inside each of the lifting arms (24), and along side an anti friction slip (77), allows it to adjust the height of the floats (60) by way of an electric motor (78). This feature is important when the vehicle (12) enters very shallow waters and needs to have the floats (60) as low as possible.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A float accessory for a vehicle comprising a front rack portion and a rear rack portion; both said rack portions being mechanically fastened to a frame assembly which is itself attached to a vehicle frame; said front rack portion being connected to said frame assembly, and said front rack portion and said rear rack portion having two sides wherein each side has a lifting arm rotationally attached thereto by way of a pivot member; said lifting arms are secured in their lowered configuration by way of a latch and catch combination; and said lifting arms are also locked in their upper configuration and intermediate configurations by way of a perforated disc cooperating with a spring lock pin; a grommet connected to at least said front rack portion lifting arms, and in combination with a cable, wherein said cable is connected to a hoist apparatus; said hoist apparatus pulling on said cable in order to lift said lifting arms; said lifting arms being attached to floats by way of a float attachment member itself being connected to an inverted "T" member configured and sized to fit inside a groove forming an integral part of said float.

2. The float accessory for a vehicle of claim 1 wherein said front rack portion being divided into two halves which are connected, at the bottom, to said frame assembly and, at the top, to a connector member.

3. The float accessory for a vehicle of claim 1 wherein said rear rack portion being divided into two halves which are connected, at the bottom, to said frame assembly and, at the top, to a connector member.

4. The float accessory for a vehicle of claim 1 wherein a plurality of rack spacer holes for adjusting the width of said front rack portion so that it can adapt to a variety of vehicles.

5. The float accessory for a vehicle of claim 4 wherein said width of said front rack portion is adjusted by passing mechanical fasteners through said rack spacer holes and frame spacer holes.

6. The float accessory for a vehicle of claim 1 wherein said rear rack portion and said front rack portion having loops for attaching hooks or straps.

7. The float accessory for a vehicle of claim 1 wherein said frame assembly having a front portion which is mechanically fastened at the front of said vehicle by way of straps passing through frame assembly grommets which connect to a vehicle's front element.

8. The float accessory for a vehicle of claim 1 wherein said frame assembly having a rear portion mechanically fastened to the location of a ball hitch by way of a ball hitch attachment bracket and wherein said ball hitch attachment bracket being slidingly connected to an attachment bracket member, and sliding tubes forming part of said front portion slidingly connecting with said rear portion.

9. The float accessory for a vehicle of claim 8 wherein said attachment bracket member having a vertical stem member extending perpendicularly and vertically therefrom and which is configured and sized to slidingly engage a channel member fixedly attached to said frame assembly and wherein mechanical fasteners secure a desired position for said vertical stem member inside said channel member.

10. The float accessory for a vehicle of claim 1 wherein a propulsion assembly extends rearwardly from said rear portion and having at least one back plate configured and sized for receiving a propulsion unit.

11. The float accessory for a vehicle of claim 10 wherein said propulsion assembly being raisable and lowerable by way of a propulsion assembly piston member, and wherein a directional orientation of said propulsion unit is adjustable by way of a directional piston member connected to a piston holding bracket.

12. The float accessory for a vehicle of claim 1 wherein said front rack portion having a set of pulleys and a centrally located roller member to guide said at least one lifting cables which has one of its end attached to grommets and the opposite end attached to said hoist apparatus.

13. The float accessory for a vehicle of claim 1 wherein said float attachment members being connected to said lifting arms by sliding through them.

14. The float accessory for a vehicle of claim 1 wherein a linear gear located inside each of said lifting arms, and alongside an anti friction slip, allows an electric motor gearingly connected thereto to adjust the height of said floats.

* * * * *